(12) United States Patent
Nguyen

(10) Patent No.: US 12,642,160 B2
(45) Date of Patent: Jun. 2, 2026

(54) TILLAGE IDENTIFICATION AND VERIFICATION TOOL USING SATELLITE TIME SERIES IMAGERY

(71) Applicant: FARMERS EDGE INC., Winnipeg (CA)

(72) Inventor: Lan Nguyen, Winnipeg (CA)

(73) Assignee: Farmers Edge Inc., Winnipeg (CA)

( * ) Notice: Subject to any disclaimer, the term of this patent is extended or adjusted under 35 U.S.C. 154(b) by 480 days.

(21) Appl. No.: 18/173,407

(22) Filed: Feb. 23, 2023

(65) Prior Publication Data

US 2023/0320253 A1 Oct. 12, 2023

Related U.S. Application Data

(60) Provisional application No. 63/312,912, filed on Feb. 23, 2022.

(51) Int. Cl.
| | |
|---|---|
| *A01B 79/00* | (2006.01) |
| *G06N 20/10* | (2019.01) |
| *G06V 10/75* | (2022.01) |
| *G06V 20/10* | (2022.01) |
| *G06V 20/13* | (2022.01) |

(52) U.S. Cl.
CPC ........... *A01B 79/005* (2013.01); *G06N 20/10* (2019.01); *G06V 10/758* (2022.01); *G06V 20/13* (2022.01); *G06V 20/188* (2022.01)

(58) Field of Classification Search
CPC .... A01B 79/005; G06N 20/10; G06V 20/188; G06V 10/758; G06V 20/13
See application file for complete search history.

(56) References Cited

U.S. PATENT DOCUMENTS

2024/0249519 A1* 7/2024 Melaas ................ G06V 10/765

OTHER PUBLICATIONS

Mountrakis et al, "Support vector machines in remote sensing: A review", 2011, ISPRS Journal of Photogrammetry and Remote Sensing 66, pp. 247-259 (Year: 2011).*

* cited by examiner

*Primary Examiner* — David F Dunphy
(74) *Attorney, Agent, or Firm* — Ryan W. Dupuis; Kyle R. Satterthwaite; Ade & Company Inc.

(57) ABSTRACT

A system and method identify/verify tillage using satellite time series imagery by executing four steps in a loop to improve accuracy over time. First, satellite data are downloaded and preprocessed to retain only "good" images. Second, from fields with validated tillage, the relationship between satellite data and corresponding tillage types is learned to define a tillage prediction model. Next, the knowledge from the previous step is used to make prediction of tillage types for new fields using image statistics of the new field as input. Finally, predicted tillage will be validated manually, if needed using supplementary information, and new fields with validated tillage will be added to the existing validated list to gain new knowledge for further establishing between satellite data and corresponding tillage types.

18 Claims, 6 Drawing Sheets

System Environment 100

MOD1:
- $goodPixels \geq 60$
- $clear\_percent \geq 60$
- $nSTD = 0$

| Index | F2751126 | F2469715 | F2452713 | F2863286 | F2469667 | F2424089 | F2459977 | F2743346 | F2750366 | F2554427 | F2482574 | F2482230 | F2763520 |
|---|---|---|---|---|---|---|---|---|---|---|---|---|---|
| V1-Baseline_linear_1.0E-04 | 0 | 1 | 1 | 1 | 1 | 1 | 1 | 0 | 0 | 0 | 0 | 1 | 0 |
| V1-Baseline_linear_1.0E+01 | 0 | 0 | 1 | 1 | 0 | 0 | 1 | 0 | 0 | 0 | 0 | 0 | 0 |
| V1-Baseline_rbf_1.0E+01 | 1 | 1 | 1 | 0 | 0 | 1 | 0 | 1 | 1 | 1 | 0 | 0 | 1 |
| V1-Baseline_rbf_1.0E+02 | 0 | 1 | 0 | 0 | 0 | 1 | 0 | 1 | 1 | 1 | 0 | 0 | 1 |
| V1-Baseline_rbf_1.0E+03 | 0 | 1 | 0 | 0 | 0 | 0 | 0 | 1 | 1 | 1 | 1 | 0 | 1 |
| V2-goodPixels_linear_1.0E-04 | 0 | 1 | 1 | 0 | 0 | 0 | 0 | 0 | 0 | 1 | 0 | 1 | 0 |
| V2-goodPixels_linear_1.0E+01 | 0 | 1 | 1 | 0 | 0 | 0 | 0 | 0 | 0 | 0 | 0 | 1 | 0 |
| V2-goodPixels_rbf_1.0E+01 | 1 | 1 | 1 | 0 | 0 | 1 | 0 | 1 | 1 | 1 | 0 | 0 | 1 |
| V2-goodPixels_rbf_1.0E+02 | 0 | 1 | 0 | 0 | 0 | 1 | 0 | 1 | 1 | 1 | 0 | 0 | 1 |
| V2-goodPixels_rbf_1.0E+03 | 0 | 1 | 0 | 0 | 1 | 1 | 0 | 1 | 1 | 1 | 0 | 0 | 1 |
| V3-Clear_linear_1.0E-04 | 0 | 1 | 1 | 0 | 1 | 0 | 0 | 0 | 0 | 0 | 0 | 1 | 0 |
| V3-Clear_linear_1.0E+01 | 0 | 1 | 1 | 0 | 1 | 0 | 0 | 0 | 0 | 1 | 0 | 1 | 0 |
| V3-Clear_rbf_1.0E+01 | 1 | 1 | 0 | 0 | 0 | 1 | 0 | 1 | 1 | 1 | 0 | 0 | 1 |
| V3-Clear_rbf_1.0E+02 | 0 | 1 | 0 | 0 | 0 | 1 | 0 | 1 | 1 | 1 | 0 | 0 | 1 |
| V3-Clear_rbf_1.0E+03 | 0 | 1 | 0 | 0 | 0 | 1 | 0 | 1 | 1 | 1 | 0 | 0 | 1 |
| Score | 3 | 14 | 8 | 2 | 3 | 10 | 2 | 9 | 9 | 11 | 1 | 5 | 9 |

TILLAGE IDENTIFICATION AND VERIFICATION TOOL USING SATELLITE TIME SERIES IMAGERY

This application claims the benefit under 35 U.S.C.119(e) of U.S. provisional application Ser. No. 63/312,912, filed Feb. 23, 2023.

FIELD OF THE INVENTION

The present invention relates to a system and method for the identification and verification of the tillage state of an agricultural field, for example a conventional tillage state or other tillage state, using image statistics calculated from remotely sensed images of the agricultural field as an input.

BACKGROUND

Tillage—turning the soil for weed/pest control and manage various soil characteristics—has been long used in crop farming. However, intensive soil tillage (conventional tillage) can increase soil erosion, loss of soil nutrients and release greenhouse gases into the atmosphere. In the past, acquisition of tillage data relies mainly on manual field-data collection, survey responses, and agricultural censuses. Unfortunately, it is extremely difficult to acquire tillage data systematically and continuously over large areas using these conventional methods. Remote sensing can help to close this gap.

Many existing studies have investigated the use of satellite remote sensing to map tillage intensity as measured by the percent of crop residue cover (CRC, reviewed by Zheng et al., 2014). Those studies often rely on spectral signature of CRC in optical wavelengths, especially the shortwave-infrared part (i.e., 2100-2400 nm) of the spectrum, to discriminate residue from background soil (Daughtry et al., 2005). At the same time, extensive work has been done to relate radar backscatter measurements in the microwave part of the spectrum to measures of soil surface roughness, which are affected by tillage (Satalino et al., 2018; Azzari et al., 2019). Tillage classification models using only radar backscatter are often less accurate than those using optical features. However, because of its ability to "see" through cloud, radar backscatter data are often used to complement optical observations (that are limited cloudy weather) in tillage mapping. One solution to the cloud problem with optical data is to use observations from multiple sensors (e.g., Landsat and Sentinel-2) or a satellite constellation, such as the PlanetScope. Although PlanetScope has not yet been used in tillage detection, possibly due to its high cost over a large area, this satellite constellation (consists of approximately 130 satellites and more to come) is able to image the Earth's surface daily at 3-m resolution over 4 spectral channels (Red, Green, Blue, and Near Infrared) (Roy et al., 2021).

The following documents are referenced above and are hereby incorporated by reference:

(i) Chang, C. C., & Lin, C. J. (2011). LIBSVM: a library for support vector machines. *ACM transactions on intelligent systems and technology (TIST)*, 2(3), 1-27. Huete, A. R., Liu, H. Q., Batchily, K. V., & Van Leeuwen, W. J. D. A. (1997). A comparison of vegetation indices over a global set of TM images for EOS-MODIS. *Remote Sensing of Environment*, 59(3), 440-451.

(ii) Zheng, B., Campbell, J. B., Serbin, G., & Galbraith, J. M. (2014). Remote sensing of crop residue and tillage practices: Present capabilities and future prospects. *Soil and Tillage Research*, 138, 26-34.

(iii) Daughtry, C. S., Hunt, E. R., Doraiswamy, P. C., & McMurtrey, J. E. (2005). Remote sensing the spatial distribution of crop residues.

(iv) Satalino, G., Mattia, F., Balenzano, A., Lovergine, F. P., Rinaldi, M., De Santis, A. P., . . . & Moreno, J. F. (2018, July). Sentinel-1 & Sentinel-2 data for soil tillage change detection. In IGARSS 2018-2018 IEEE *International Geoscience and Remote Sensing Symposium* (pp. 6627-6630). IEEE.

(v) Azzari, G., Grassini, P., Edreira, J. I. R., Conley, S., Mourtzinis, S., & Lobell, D. B. (2019). Satellite mapping of tillage practices in the North Central US region from 2005 to 2016. *Remote Sensing of Environment*, 221, 417-429.

(vi) Roy, D. P., Huang, H., Houborg, R., & Martins, V. S. (2021). A global analysis of the temporal availability of PlanetScope high spatial resolution multi-spectral imagery. *Remote Sensing of Environment*, 264, 112586.

SUMMARY OF THE INVENTION

According to one aspect of the present invention there is provided a system for verifying a tillage state of an agricultural field, the system comprising:

a memory storing programming instructions thereon;

at least one processor operably coupled to the memory so as to execute the programming instructions whereby said at least one processor is configured to:

(i) obtain one or more remotely sensed images of the agricultural field;

(ii) calculate image statistics for the one or more remotely sensed images of the agricultural field; and (iii) determine a predicted tillage state of the agricultural field by applying the image statistics to at least one tillage prediction model stored on the memory, in which the at least one tillage prediction model establishes a direct relationship between image statistics derived from a plurality of time series remotely sensed images of a plurality of training fields and the known tillage states of the plurality of training fields respectively.

Preferably, the processor is further configured to train the at least one tillage prediction model by (i) deriving the images statistics from the plurality of time series remotely sensed images of the plurality of training fields, and (ii) establishing said direct relationship of the said at least one tillage prediction model using the images statistics of the time series remotely sensed images of the training fields and known tillage states which are validated independently of the time series remotely sensed images of the training fields.

According to another aspect of the invention there is provided a method of verifying a tillage state of an agricultural field, the method comprising:

obtaining one or more remotely sensed images of the agricultural field;

providing at least one tillage prediction model establishing a direct relationship between image statistics derived from a plurality of time series remotely sensed images of a plurality of training fields and the known tillage states of the plurality of training fields respectively;

calculating image statistics for the one or more remotely sensed images of the agricultural field; and applying the image statistics to the at least one tillage prediction model to determine a predicted tillage state of the agricultural field.

The tillage identification and verification tool (TIVT) system and method according the present invention is a unique approach to focus on tillage signals in the visible spectrum using very high spatiotemporal resolution time series images. TIVT is directly links spectral response of a field to its tillage class. Thus, it does not require an intensive field campaign to measure crop residue cover.

The system and/or method may further include training the at least one tillage prediction model by obtaining the plurality of time series remotely sensed images of the plurality of training fields, deriving the images statistics from the plurality of time series remotely sensed images of the plurality of training fields, validating said known tillage states independently of the time series remotely sensed image, and establishing said direct relationship of the said at least one tillage prediction model using the images statistics of the time series remotely sensed images of the training fields and the validated known tillage states.

The system and/or method may further include assigning the tillage states of the plurality of training fields as either (i) a conventional tillage state representative of conventional tillage, or (ii) a nonconventional tillage state representative of zero tillage, minimum tillage, or reduced tillage.

The system and/or method may further include the at least one tillage prediction model comprising a two dimensional plot of the image statistics derived from the training fields including decision boundaries using support vector classifiers in which the decision boundaries distinguish between two different tillage states, and wherein the predicted tillage state of the agricultural field is determined by plotting the calculated image statistics for the one or more remotely sensed images of the agricultural field relative to the decision boundaries.

The system and/or method may further include said at least one tillage prediction model comprising a plurality of tillage prediction models, some of the tillage prediction models being distinguished from one another by a width between the decision boundaries by applying different parameters when plotting the decision boundaries.

In the system and/or method said at least one tillage prediction model comprising a plurality of tillage prediction models, and the system and/or method may further include: (i) for each tillage prediction model, determining a tillage state prediction expressed in binary form distinguishing between a conventional tillage state and a nonconventional tillage state; and (ii) calculating the predicted tillage state for the agricultural field as a probability derived from the binary tillage state predictions from the plurality of tillage prediction models.

The system and/or method may further include, for predicted tillage states above an upper probability threshold, (i) validating the predicted tillage state as a known tillage state, and (ii) applying the remotely sensed images of the agricultural field and the known tillage state of the agricultural field to the at least one tillage prediction model to further establish said direct relationship between the image statistics and the known tillage states of the model.

The system and/or method may further include, for predicted tillage states below a lower probability threshold, (i) validating the predicted tillage state as a known tillage state, and (ii) applying the remotely sensed images of the agricultural field and the known tillage state of the agricultural field to the at least one tillage prediction model to further establish said direct relationship between the image statistics and the known tillage states of the model.

The system and/or method may further include, for predicted tillage states between a lower probability threshold and an upper probability threshold, (i) validating a tillage state of the agricultural field independently of the remotely sensed images of the agricultural field, and (ii) applying the remotely sensed images of the agricultural field and the independently validated tillage state of the agricultural field to the at least one tillage prediction model to further establish said direct relationship between the image statistics and the known tillage states of the model.

The system and/or method may further comprise the remotely sensed images of the agricultural field including Landsat or Sentinel satellite images and one of the at least one tillage prediction models is derived from Landsat or Sentinel satellite images of the training fields.

The system and/or method may further include the image statistics for said one of the at least one tillage prediction model comprising spectral indexes of the Landsat or Sentinel satellite images, and using the spectral indexes in support vector classifiers to determine decision boundaries distinguishing between two different tillage states.

The system and/or method may further comprise the spectral indexes used by the support vector classifiers to determine the decision boundaries including RGB Standard and RGB Minimum.

The system and/or method may further comprise the spectral indexes used by the support vector classifiers to determine the decision boundaries including NDTI Median and RGB Minimum.

The system and/or method may further comprise the remotely sensed images of the agricultural field including PlanetScope satellite images in which one of the at least one tillage prediction models is derived from PlanetScope satellite images of the training fields.

The system and/or method may further comprise the image statistics for said one of the at least one tillage prediction model including Red-Green-Blue reflectance of the PlanetScope satellite images, and using the Red-Green-Blue reflectance in support vector classifiers to determine decision boundaries distinguishing between two different tillage states.

The system and/or method may further include: (i) assessing the remotely sensed images of the agricultural field to determine low quality pixels resulting from clouds; and (ii) removing remotely sensed images having a number of low quality pixels above a threshold amount from the one or more remotely sensed images that are applied to the at least one tillage prediction model to determine the predicted tillage state of the agricultural field.

The system and/or method may further include: (i) assessing observational conditions for the remotely sensed images of the agricultural field; and (ii) applying only the remotely sensed images having optimal observational conditions to the at least one tillage prediction model to determine the predicted tillage state of the agricultural field.

The system and/or method may further include: (i) assessing NDVI for the remotely sensed images; and (ii) removing remotely sensed images dated a prescribed number of days before NDVI first exceeds a threshold amount from the one or more remotely sensed images that are applied to the at least one tillage prediction model to determine the predicted tillage state of the agricultural field.

BRIEF DESCRIPTION OF THE DRAWINGS

One embodiment of the invention will now be described in conjunction with the accompanying drawings in which:

FIG. 7 is a table of tillage state predictions from a plurality of different prediction models for each one of a plurality of different agricultural fields in which 0 and 1 represent non-conventional tillage (nonCT) and conventional tillage (CT).

In the drawings like characters of reference indicate corresponding parts in the different figures.

DETAILED DESCRIPTION

Figure 1:
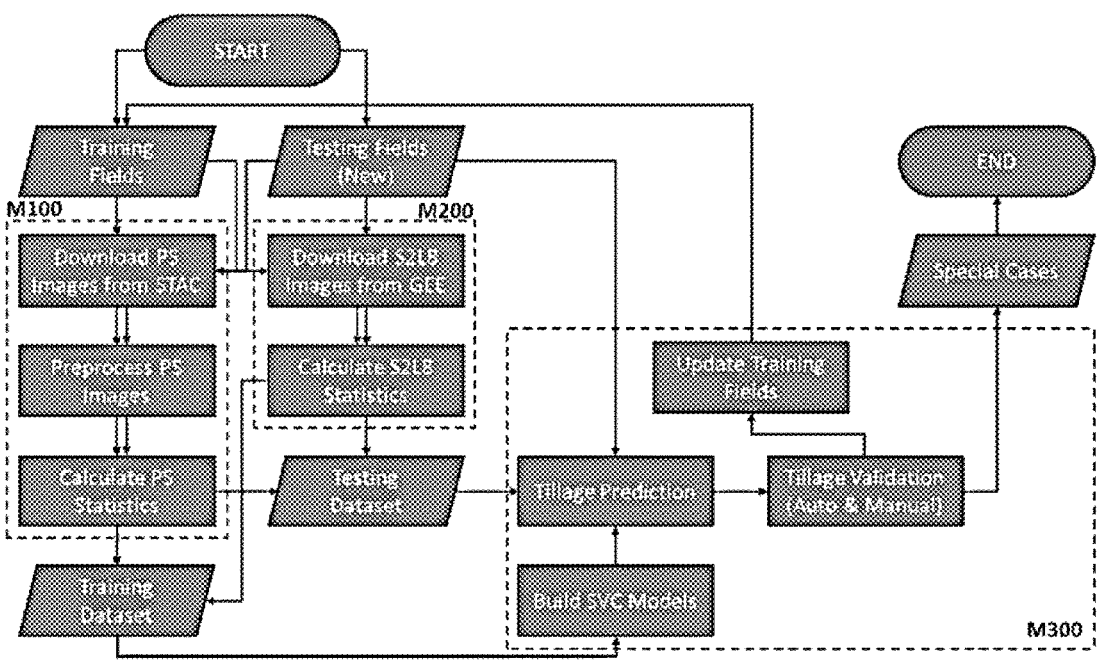
FIG. 1 illustrates a demo workflow (for PS and S2L8 datasets) and major components of TIVT of the tillage state verification system according to the present invention in which: M100 represents data downloading and processing for PlanetScope imagery, M200 represents data download and processing for Sentinel-2/Lansat-8 imagery, and M300 represents the identification/verification of tillage types. In this instance M100 and M200 are both used to download and process satellite time series (for different datasets); however, if only one satellite dataset is used, only one module to process that satellite dataset can be used.

Referring to the accompanying figures, there is illustrated a tillage state verification system for executing a process described herein to provide the function of a Tillage Identification/Verification Tool (TIVT) according to the present invention.

The tillage state verification system generally operates within a system environment 100 including a network system 110 which communicates with an observation system 160 and a client system 140 over a network 150. The network 150 may be any suitable form of computer network, for example a local area network, a communications network, the internet, and the like, or any combination thereof.

The client system 140 may be any type of personal computer device operated by a user of the tillage state verification system. For example, the personal computer device may comprise a desktop computer, a laptop computer, a portable tablet computer, or a smartphone. In each instance, the personal computer device includes one or more processors arranged to execute programming instructions stored on a computer memory to perform the various functions described herein, and a communications device configured to allow the personal computer device to communicate with the network system 110 over the network 150.

The observation system 160 according to the present invention comprises a satellite network for obtaining remotely sensed images in the form of satellite images captured by the satellite network and relayed to an image database for storage and retrieval. The observation system 160 is able to communicate the image data over the network 150 to the network system 110.

The network system 110 according to the present invention is a computer server system which may comprise one or more computers communicating with one another locally or over a distributed network. In either instance, the network includes one or more processors arranged to execute programming instructions stored on a computer memory to perform the various functions described herein. The network system 110 further includes a database 120 for storing image data and validation data such as time-series of remotely sensed images acquired from the observation system, along with validation data which confirms the tillage state of the images when available. As the system acquires more image data and verified tillage states associated with the image data, the image and validation data stored on the database 120 is continuously updated.

The tillage state identification or verification process executed on the network system begins by (i) Data Downloading and Processing Module M100 which downloads and processes data for PlanetScope imagery acquired from the database 120 and/or the observation system 160 over the network 150, and/or (ii) Data Downloading and Processing Module M200 which downloads and processes data for Sentinel-2/Landsat 8 imagery acquired from the database 120 and/or the observation system 160 over the network 150. The modules M100 and M200 process the acquired remotely sensed image data by calculating various image statistics relating to the image data.

The network system 110 further includes an identification and verification module M300 that uses a plurality of tillage prediction models that each establish a direct relationship between the image statistics derived from a plurality of time series remotely sensed images of a plurality of training fields and the known tillage states of the plurality of training fields respectively. The identification and verification module M300 applies image statistics calculated by the modules M100 and/or M200, in relation to an agricultural field where the tillage state is sought, to the tillage prediction models to obtain respective tillage state predictions associated with the agricultural field. The tillage state predictions are then combined to determine a predicted tillage state for the agricultural field.

Once a predicted tillage state has been determined, a reporting module 130 of the network system 110 then reports the predicted tillage state to the user, for example by communicating over the network to the client system 140.

Before initial use of the tillage state verification system, and on an ongoing basis as more data is acquire, the tillage prediction modules are trained with acquired data. Training can be done by obtaining the plurality of time series remotely sensed images of the plurality of training fields, deriving the images statistics from the plurality of time series remotely sensed images of the plurality of training fields, validating the known tillage states independently of the time series remotely sensed image, and establishing the direct relationship of the tillage prediction models using the images statistics of the time series remotely sensed images of the training fields and the validated known tillage states.

The tillage states of the plurality of training fields are typically assigned as either (i) a conventional tillage state representative of conventional tillage, or (ii) a nonconventional tillage state representative of zero tillage, minimum tillage, or reduced tillage.

Each tillage prediction model described in further detail below comprises a two dimensional plot of the image statistics derived from the training fields including decision boundaries using support vector classifiers in which the decision boundaries distinguish between two different tillage states. The predicted tillage state of the agricultural field is determined by plotting the calculated image statistics for the one or more remotely sensed images of the agricultural field relative to the decision boundaries. Some of the tillage prediction models are distinguished from one another by a width between the decision boundaries by applying different parameters when plotting the decision boundaries.

When using a plurality of tillage prediction models, a tillage state prediction is determined for each tillage prediction model and is expressed in binary form distinguishing between a conventional tillage state and a nonconventional tillage state. The predicted tillage state for the agricultural field is then calculated as a probability derived from the binary tillage state predictions from the plurality of tillage prediction models.

For predicted tillage states below a lower probability threshold, the predicted tillage state is validated as a known tillage state, and then the remotely sensed images of the agricultural field and the known tillage state of the agricultural field are applied to the at least one tillage prediction model to further establish the direct relationship between the image statistics and the known tillage states of the model.

For predicted tillage states between a lower probability threshold and an upper probability threshold, the tillage state of the agricultural field is validated independently of the remotely sensed images of the agricultural field. The remotely sensed images of the agricultural field and the independently validated tillage state of the agricultural field can then be applied to the at least one tillage prediction model to further establish the direct relationship between the image statistics and the known tillage states of the model.

According to the tillage state verification system, the remotely sensed images of the agricultural field are assessed to determine low quality pixels resulting from clouds. In this instance, remotely sensed images having a number of low quality pixels above a threshold amount are removed from the one or more remotely sensed images that are applied to the tillage prediction models to determine the predicted tillage state of the agricultural field.

Within the tillage state verification system observational conditions for the remotely sensed images of the agricultural field are also assessed. Only the remotely sensed images having optimal observational conditions are applied to the tillage prediction models to determine the predicted tillage state of the agricultural field.

The tillage state verification system also assesses NDVI for the remotely sensed images. Remotely sensed images dated a prescribed number of days before NDVI first exceeds a threshold amount are then removed from the one or more remotely sensed images that are applied to the tillage prediction models to determine the predicted tillage state of the agricultural field.

The TIVT according to the present invention identifies or verifies tillage state using satellite time series imagery. The main ideas of TIVT come from two observations of a conventional tillage event:

(i) A field often looks quite darker on true-color-composite (RGB) time series images after a conventional tillage event due to a few possible reasons: (1) less crop residue, which normally has higher reflectance in the visible spectrum, on the field's surface, (2) higher soil moisture and organic matter content of deeper soil that now becomes topsoil. Thus, in the PlanetScope time series, a conventional tillage field would have very low minimum Red-Green-Blue (RGB) reflectance.

(ii) A conventional tillage significantly reduces the amount of crop residue cover on the field's surface, leading to an increase of NDTI (Normalized Difference Tillage Index; Huete et al., 1997). Therefore, statistics of NDVI time series (i.e., minimum or median NDTI) are expected to be higher for non-conventional tillage fields.

It is important to note that the embodiment of TIVT is applicable for other satellite platforms/constellations with good spatiotemporal coverage. In this document, PlanetScope (PS) and Sentinel-2/Landsat 8 (S2L8) time series were used to demonstrate TIVT's workflow.

TIVT is comprised of four steps that go in a loop to improve its accuracy over time as follows: (1) download and process satellite data, (2) from fields with validated tillage, learn the relationship between satellite data and corresponding tillage types, (3) predict tillage types of new fields using the relationship learnt from the previous step, and (4) validated tillage information (if needed) using supplementary information, update the list of validated fields, and get back to step (1) to start tillage prediction for another set of new fields.

FIG. 1 illustrates a demo workflow (for PS and S2L8 datasets) and major components of TIVT: (1) M100—data downloading and processing for PlanetScope imagery, (2) M200—data download and processing for Sentinel-2/Lansat-8 imagery, and (2) M300—identification/verification of tillage types. Note that M100 and M200 are both used to download and process satellite time series (for different dataset). If only one satellite dataset is used, we will need only one module to process that satellite dataset.

Input Data:

(i) Boundaries of training and testing fields in the ERSI shapefile format. Training fields are fields with validated tillage information. Those fields are used to gain knowledge about the relationship between fields' spectral signature and their tillage activities. Testing fields are fields with unknown (or known but with low confidence) tillage information. Knowledge gained from training fields will be applied to testing fields to identify or verify tillage types of testing fields.

(ii) Supplementary information for fields, for example: jobs (type and date of activities happened on the fields), tillage information provided by crop producers. This information helps to further validate predicted tillage types of testing fields.

(iii) Satellite time series imagery: Sentinel-2/Landsat-8, and PlanetScope.

(iv) Temporal window for satellite data is from April-1 to July-31.

PS Download and Processing Module 100 (M100):

M100 is used to download and process PlanetScope time series. Outputs of M100—statistics derived from Red-Green-Blue reflectance of PS images—will be used in Support Vector Classifiers to retrieve CT-nonCT boundaries and to classify tillage type of a new crop field.

(i) Process 101 (P101): P101 downloads PS products generated by FE, such as "zoneclip0" and "cloudmask" from STAC—FE's database for satellite imagery. This process makes use of existing python script (image-_services.py) in FE's Remote Sensing repository.

Figure 2:
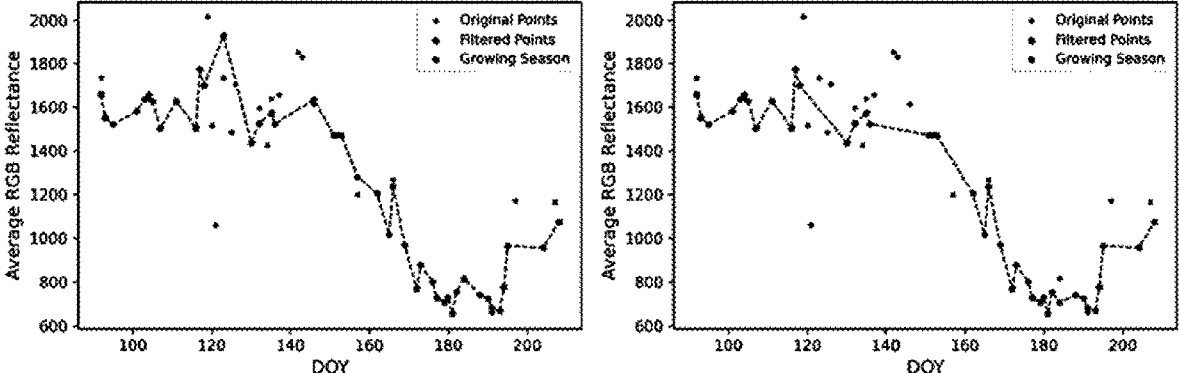
FIG. 2 illustrates different preprocessing options of PlanetScope time series imagery for an example field. Data filtering of the left panel is less rigorous than of the right panel, and thus, retains more data points. Red points (points that are not connected to the dashed line) present PS images with bad observational conditions. Green points (points that are connected by the dashed line on the right half of each image) present PS images that belong to early growing season. Remaining "good" observations to be used in tillage detection are presented as black points (points that are connected by dashed line on the left half of each image).

(ii) Process 102 (P102): P102 filters PS images to remove observations with low quality using "cloudmask", metadata of PS OrthoTiles retrieved from Planet API, and NDVI time series. Note that there are multiple ways to filter "bad" observations from the original time series. FIG. 2 show examples of those filtering. P102.1: The "cloudmask" is used to compute amounts of "good" pixels covering a crop field. Only images that have clear view on at least 60% of the field area will be kept for further analysis. P102.2: Metadata of PS OrthoTiles—sun elevation, clear condition, cloud/shadow, haze, snow and ice—are retrieved using Planet API to access overall observational condition of PS OrthoTiles. Because spectral signature of tillage is very subtle, only OrthoTiles observed in "good" conditions will be used in the further analysis. For example, there can be multiple observations per day but only images taken round noon will be kept for the best view on the field. P102.3: NDVI time series is used to filter all observations belong to early growing season (as no tillage should happen at this point). Images taken from 10-days before the day of first NDVI of above 0.3 to the end of the temporal window are removed.

(iii) Process 103 (P103): From each remaining "good" PS image, P103 computes mean RGB reflectance. The RGB time series is then used to calculate several statistics (e.g., min and average of RGBs–RGB_Min and RGB_Avg, standard deviation of RGBs–RGB-_Std) to be input SVC models for classification of tillage types.

S2L8 Download and Processing Module 200 (M200):

M200 is used to download and preprocess Sentinel-2/Landsat-8 time series. Outputs of M200—statistics derived from spectral indexes of the S2L8 dataset—will be used in Support Vector Classifiers to retrieve CT-nonCT boundaries and to classify tillage type of a new crop field.

Process 201 (P201): P201 queries, preprocesses (filter "bad" pixels by the built-in cloud, shadow, snow masks), and then, exports S2L8 data from Google Earth Engine (GEE) using the GEE's Python API. Outputs of P201 are field-level (average and median) spectral reflectance of all "good" images on the field within the temporal window. At the end of P201, GEE data are exported into csv files to be used in the next process.

Process 202 (P202): From exported time series of "good" 52L8 images, P202 computes time series of several spectral indices, (e.g., NDTI: Normalized Difference Tillage Index, ModCRC: Modified Crop Residue Cover) which have been used widely to detect crop residue cover and to monitor tillage practices using multispectral satellite imagery (Zheng et al., 2014). Then, various statistics are calculated from those spectral indices to be used as input to SVC models to classify tillage types (e.g., median of NDTIs–NDTI_Med, min of ModCRCs–ModCRC_Min).

Figure 3:
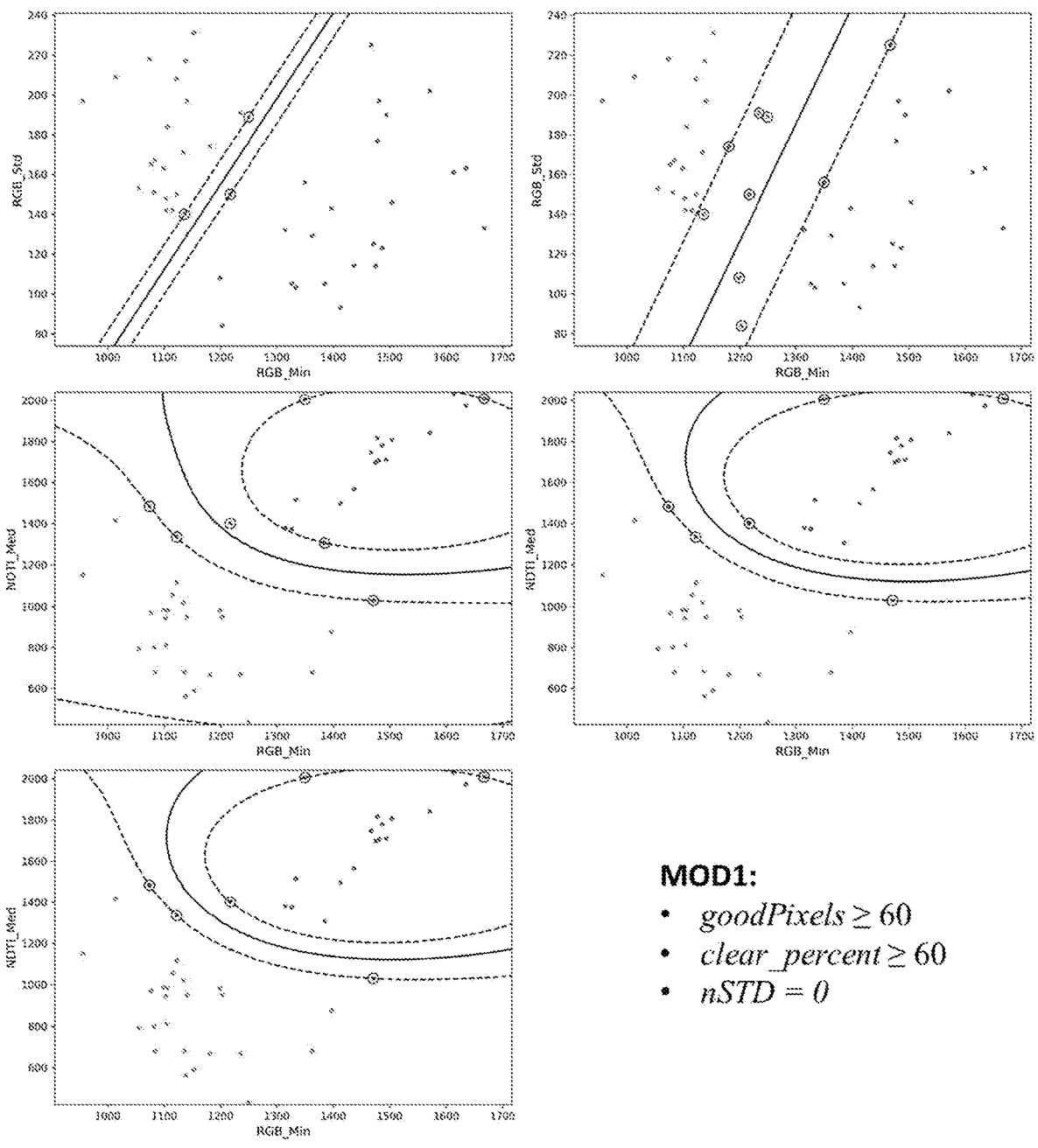
FIG. 3 illustrates the results of various tillage prediction models in which each model illustrates the decision boundaries (black solid lines) that separate between CT fields (red points or points that are to the left of and below the decision boundaries) and nonCT fields (blue points or points that are to the right of and above the decision boundaries) of the training dataset on 2-D planes given by {RGB_Min & RGB_Std} (top panels) and {RGB_min & NDTI_Med} (lower panels).

Tillage Classification and Update Module 300 (M300):

M300 is used to generate decision boundaries to separate tillage types (using Support Vector Classifier; Chang & Lin, 2011), test tillage prediction on the testing dataset, and update the training dataset to derive new decision boundaries Process 301 (P301): P301 generates boundaries between CT and nonCT fields (SVC models) of the training dataset on the two-dimensional planes given by various pairs of input variables, for example: minRGB vs. stdRGB, minRGB vs. medNDTI (FIG. 3). These boundaries are used in the next to predict tillage types of "unknown" fields in the testing dataset.

Process 302 (P302): P302 predicts tillage types of testing fields (new) using boundaries (SVC models) generated in P301. For each field, predicted tillage types from various SVC models are stored in a binary array with 1 and 0 represents CT and nonCT, respectively. The binary arrays are then used to compute probability of being CT fields for all testing fields according to the following Table 1 which illustrates the probabilities of being CT for 40 testing fields.

TABLE 1

| | Field | Prob. |
|---|---|---|
| 0 | F2751126 | 20 |
| 1 | F2469716 | 93.3 |
| 2 | F2884844 | 0 |
| 3 | F2810902 | 0 |
| 4 | F2621479 | 100 |
| 5 | F2452713 | 53.3 |
| 6 | F2863286 | 33.3 |
| 7 | F2800840 | 0 |
| 8 | F2751118 | 100 |
| 9 | F2469667 | 6.7 |
| 10 | F2569452 | 0 |
| 11 | F2424089 | 60 |
| 12 | F2621501 | 100 |
| 13 | F2482637 | 0 |
| 14 | F2533057 | 0 |
| 15 | F2459977 | 13.3 |
| 16 | F2621483 | 100 |
| 17 | F2522361 | 0 |
| 18 | F2478526 | 100 |
| 19 | F2412799 | 0 |
| 20 | F2732248 | 100 |
| 21 | F2748346 | 60 |
| 22 | F2528889 | 0 |
| 23 | F2602703 | 0 |
| 24 | F2760329 | 100 |
| 25 | F2732240 | 0 |
| 26 | F2750366 | 60 |
| 27 | F2554427 | 73.3 |
| 28 | F2621535 | 100 |
| 29 | F2898489 | 0 |
| 30 | F2554387 | 0 |
| 31 | F2535670 | 100 |
| 32 | F2621545 | 100 |
| 33 | F2482574 | 6.7 |
| 34 | F2760776 | 0 |
| 35 | F2482230 | 33.3 |
| 36 | F2621497 | 100 |
| 37 | F2763520 | 60 |
| 38 | F2634189 | 0 |
| 39 | F2478540 | 0 |

Process 303 (P303): P303 is a semi-automatic process to validate tillage types and update some testing fields to the existing training dataset. Fields with high probability (i.e., 90-100) can be assigned as CT, and fields with low probability (i.e., 0-10) can be assigned as nonCT. Those fields have very strong signals of being CT or nonCT, and thus, can be added to the training dataset without further validation. Fields, which do not show strong CT or nonCT signals (i.e., 10-90), would need to be validated manually using supplementary information (if exists). After the manual validation, those fields can be added to the training dataset (if the manual validation can confirm tillage type with high confidence) or stored as "special cases" (if the manual validation is not able to confirm tillage type with high confidence).

Study Area:

A study was conducted focusing on fields in Alberta, Canada. Crops in the northern and central Alberta are rainfed while fields in the southern region can be irrigated due to dry climate.

Focus was further directed to the 2021 tillage season (from late 2020 to early 2021). Due to bad weather condition in fall that often trouble acquisition of satellite images and a low number of fields with fall conventional tillage, the imagery datasets only span between Apr. 1, 2021 and Jul. 31, 2021.

Data:

Alberta fields in the 2021 season. Alberta fields in the 2021 season (clients of Farmers Edge) with tillage information were queried and downloaded from VOLTRON. Only tillage types are available on VOLTRON, including zero tillage—ZT, minimum tillage—MT, and conventional tillage—CT. In addition, we do not know when and how the VOLTRON's tillage information was collected (possibly from clients' self-reports) as well as how accurate it is.

Small tillage dataset based on manual inspection of PS images on Planet Explorer. A quick check of the VOLTRON's tillage information for some random fields on Planet Explorer indicated that many ZT and MT fields may appear like CT fields, possibly due to incorrect answers in the tillage survey and the ambiguous definitions of tillage categories. To retrieve the tillage dataset with the highest possible confidence level, we manually inspect 200 fields (including all 3 tillage categories: ZT, MT, and CT) on Planet Explorer to confirm their VOLTRON's tillage information. Those inspected fields were split between 4 researchers, and decisions of each person (on tillage types) were cross-checked by the others to yield higher accuracy. At the end of the manual process, we only kept Satellite time series imagery involved two types as described in the following.

Sentinel-2 and Landsat-8

In this project, Sentinel-2 (S2) and Landsat 8 (L8) top-of-atmosphere (TOA) images available in the Google Earth Engine (GEE) platform were used. GEE is a cloud-based platform that makes it easy to process very large geospatial datasets by utilizing Google's massive computational capabilities and housing a large repository of publicly available, ready-to-use geospatial datasets (e.g., satellite and aerial images, environmental variables, weather and climate data, land cover, topographic and socio-economic datasets) (Gorelick et al., 2017).

Sentinel-2 is a wide-swath, high-resolution, multi-spectral imaging from the European Copernicus program. The mission specification of the twin satellites is designed to give a high revisit frequency of 5 days at the Equator. Each satellite carries an optical instrument payload (Multi Spectral Instrument—MSI) that samples 13 spectral bands: four bands at 10 m (including Red, Green, Blue and NIR), six bands at 20 m, and three bands at 60 m spatial resolution. There are two Sentinel-2 products available for users: L1C and L2A (TOA and surface reflectance, respectively). Both products are available in 100×100 km² tiles and delivered free-of-charge through multiple sources, including the Google Earth Engine (GEE) platform. In this study, L1C product was used.

Landsat, a joint program of the USGS and NASA, has been observing the Earth continuously from 1972 through the present day. Landsat 8 is the most recently launched Landsat satellite and carries the Operational Land Imager (OLI) and the Thermal Infrared Sensor (TIRS) instruments. OLI measures in the visible, near infrared, and shortwave infrared portions of the spectrum along 185 km wide swath at 15 m and 30 m resolution. Here, only Landsat 8 TOA images from Collection 1 Tier 1—scenes with the highest radiometric and positional quality—were used.

For each studied field, we selected all images that intersect with the field boundary and have cloud cover of less than 90%. We then filtered "bad" pixels (cloud, cirrus, shadow, ice, and snow) from S2 and L8 images using the built-in quality control (bitmask) layers ('QA60' for Sentinel-2 and 'BQA' for Landsat 8). After the filtering, only images that provide "good" view on at least 50% of the field area were kept.

PlanetScope

PlanetScope is a constellation of currently >180 DOVE satellites (operated by Planet Labs Inc.) in sun-synchronous orbits that can image the entire Earth's land surface every day in the visible to near infrared spectrum at approximate 3 m resolution. Although DOVE satellites do not have onboard sensor-calibration devices and maintained orbits, their very high spatiotemporal images offer significant opportunities for a variety of applications, especially those require both high spatial and high temporal resolution data.

Here we used two PlanetScope products created by Farmers Edge: (1) 'zoneclip0'—spectral bands clipped to the field boundaries, and (2) 'cloudmask'—cloud masking layer created only for areas covered under the field boundaries. The two products are stored in the company imagery database—STAC.

Methodology:

A history of method development will now be described. The project starts with downloading the field boundaries and tillage information from VOLTRON. Assuming that the VOLTRON's tillage information is highly accurate, an initial idea ($1^{st}$ and $2^{nd}$ reports were done on Confluence) machine learning (ML) model to link tillage type and various spectral indexes (e.g., NDTI, ModCRC, NDI5, NDI7) derived from S2L8 time series. We then tried a deep leaning approach (Long Short-Term Memory—LSTM) for tillage classification in Alberta (corresponding to a 3rd report).

Summary of the $1^{st}$ report: Note that this test performed on 1971 random fields selected from both US and Canada clients (1717 fields after filtering for fields with "good" number of observations). Overall accuracies (OAs) for models using Canada (979), USA (738), Canada_&_USA (1717) fields are not very high (max of 0.65 for Canada using Random Forest Classifier). Spectral features generated from median field-level reflectance yield slightly better than those generated from mean field-level reflectance.

Summary of the $2^{nd}$ report: this test only performed for the 2021 Alberta fields. Although overall accuracies are higher than in the $1^{st}$ report (approximate 0.8), producer's and user's accuracies are low for conventional tillage—the focus of Carbon program. We also have imbalance dataset problem in Alberta (only 132 out of 2556 fields are CT fields) →perhaps, we should focus on PA or UA of CT rather than trying to achieve the best OA. Boxplot of field-level median NDTIs for the 2 tillage types indicates low inter-class separability. It suggests that VOLTRON's tillage information may not be very accurate.

Summary of the $3^{rd}$ report: performed for the 2021 Alberta fields. LSTM models have similar accuracies to ML models. However, LSTM models give more output options (more sensitive to class weights given to CT events) so we can choose model that serve our purpose the best.

Results of ML/LSTM models indicate that VOLTRON's tillage information may not be accurate (to our expectation) as many ZT, MT fields were classified as CT. Visual inspection of some ZT, MT fields on Planet Explorer confirmed that sometimes, ZT and MT fields may look like CT.

To have a better tillage dataset, RS team manually inspect ~200 fields on Planet Explorer (refers to section 2.2.2). Since the definition of MT is too fuzzy and the focus of TIVT is CT fields, we decided to regroup tillage information into only 2 types: conventional tillage (CT) and non-conventional tillage (nonCT). Some random 'validated' fields were then inspected using both PS images on Planet Explorer and on STAC. This process (human-learning) aims to gain 'signals' that can be used to identify and verify tillage types (corresponding to a 4th report).

Summary of the $4^{th}$ report: There are few important findings from the manual inspection. Soil disturbance activities (tillage, seeding, etc.) make the field surface to look darker (lower RGB values). Weather conditions over the field and the entire OrthoTile (such as cloud, shadow, haze), local acquisition time (related to view angle) can have significant impacts on reflectance. Surround features (e.g., water bodies, rivers), climatic zones (dry vs. wet zones) also impact reflectance from the field.

Using knowledge gained from the $4^{th}$ report, the tillage identification/verification tool (TIVT) was developed.

The tillage identification/verification tool using PS and S2L8 time series is described in the following.

The first step relates to the download and processing of Sentinel-2 and Landsat 8 images.

The download and preprocessing of S2L8 data took place in GEE. For each field, we selected all images that intersect with the field boundary and have cloud cover of less than 90%. We then filtered 'bad' pixels (cloud, cirrus, shadow, ice, and snow) from S2 and L8 images using the built-in quality control (bitmask) layers ('QA60' for Sentinel-2 and 'BQA' for Landsat 8). After the filtering, only images that provide 'good' view on at least 50% of the field area were kept and clipped to the field boundary. Finally, field-level median reflectance was computed for each image, and the reflectance time series was exported to a csv file.

From exported csv files, we compiled the 52L8 time series dataset for all fields. Note that field with more than (4+month_span) observations were kept making sure that we have enough information to detect tillage. The 'month_span' (from 1 to 4) is a number of months that the field has at least one 'good' image. For each field, NDTI time series, and then, min & median NDTI over the entire time window (NDTI_Min and NDTI_Med) were computed to be used in later steps.

The second step relate to the download and processing of PlanetScope images.

Two PS products (zoneclip0 and cloudmask) generated by Farmers Edge from PS OrthoTiles were download from STAC using an existing python script (image_services.py). Only images that cover more than 60% of the field area were kept (percentImageCoverage_v2). We then used 'cloudmask' to remove 'bad' pixels from each image and computed a ratio between a number of good pixels and the total number of pixels on the field: goodPixels.

The overall weather condition of the studied area and local acquisition time also significant impact the field's reflectance. We used the Planet API for data search and download to retrieve those PS OrthoTiles's metadata. Retrieving information includes sun_azimuth, sun_elevation (related to local acquisition time), clear_percent (overall clearness of the observational condition), cloud_percent, heavy_haze_percent, light_haze_percent, shadow_percent, and snow_ice_percent. Note that clear_percent have already considered cloud, shadow, haze, snow/ice. Only images captured near local 12:00 PM were kept to yield the best view of the field. Those images have sun_elevation of above 30 degrees.

For each field, we computed field-level mean RGB values from RGB bands of the zoneclip0 products. To further remove outliers from the RGB time series, we also computed mean and standard deviation of the time series and excluded observations outside the (mean RGB+n*STD) range where n is an integer number defining how far a datapoint can be from the mean RGB. Finally, the RGB time series was filtered using different thresholds of goodPixels, clear_percent, and nSTD (FIG. 2).

Three filtering options were used in this project: (i) Mod 1 filtering: goodPixels≥60, clear_percent≥60, and nSTD=0; (ii) Mod 2 filtering: goodPixels≥90, clear_percent≥60, and nSTD=3; and (iii) Mod 3 filtering: goodPixels≥80, clear_percent≥70, and nSTD=3.

Note that there are many options for filtering variables and thresholds. Here we only demonstrate an example of how to perform the filtering process. Instead of clear_percent, specific weather conditions (cloud, shadow, haze, snow/ice) can be used to fine tune the filtering process.

Lastly, we don't want to include images that are too close to the growing season as tillage is not likely to happen at that time. To do so, we computed NDVI time series, detected the first date of NDVI 0.3, and remove all images 10-days prior that date to the end of the temporal window (FIG. 2).

At the end of the filtering process, minimum and standard deviation were computed from the remaining 'good' RGB values (RGB_Min and RGB_Std) to be used in later steps.

It is very important to note that field with fall CT will be marked as nonCT for SVC model using only PS data. It is because PS images only search for activity in Spring (from April-1 to July-31). SVC models using NDTI variables can detect Fall tillage (when NDTI does not detect crop residue on Spring images).

The next step involves building a base line model from initial set of training data.

From the manually inspected fields, we were able to select 46 fields (25 CT and 21 nonCT) that we all have very high confidence about their tillage types. Those fields—the 'initial' training dataset—were used to build the initial models (Support Vector Classifiers) that separate between CT and nonCT fields. The idea is that we try to draw decision boundaries in slightly different ways, and then, see which field would have consistent tillage types given various decision boundaries above. In total, 15 models were performed (3 filtering×5 parameter options for each filtering).

The next step relates to testing and updating models.

We randomly selected 40 new fields (10 CT, 10 MT, and 20 ZT) to test TIVT. Each new fields get tillage prediction from the 15 initial models. Outputs of all models were summarized as a probability that a field was conventionally tilled (score from 0 to 100). Fields with 100 and 0 scores are those with very strong signals of being CT and nonCT (ZT) fields, respectively. Those fields can be updated directly to the training dataset. Fields with scores between 0 and 100 need further validation using supplementary data sources. After validation, fields with 'confirmed' tillage type can be added to the training list, and the rest will be stored as special cases.

Results

Figure 4:
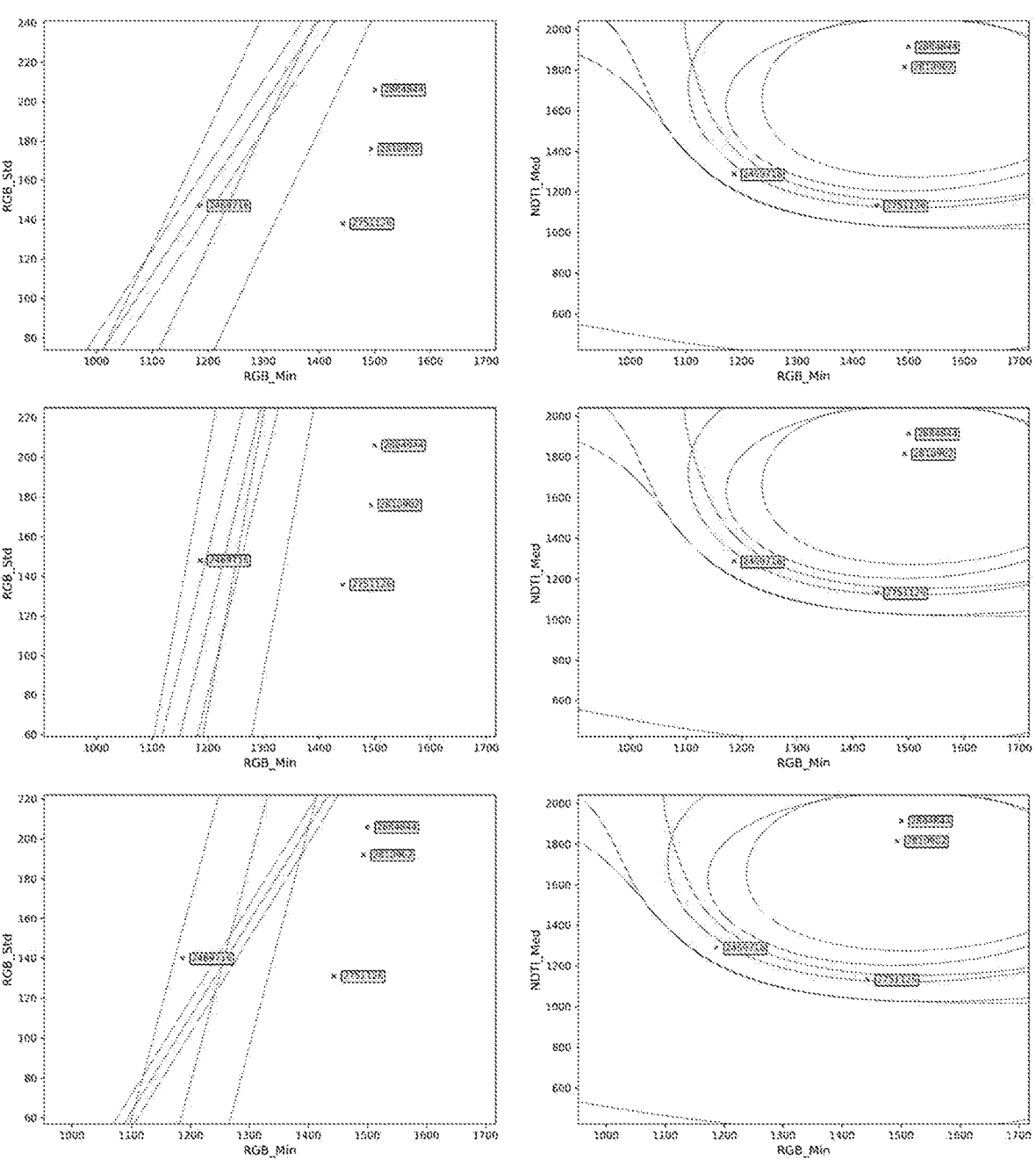
FIG. 4 illustrates the tillage predictions of 4 sample fields applied to six different tillage prediction models.

FIG. 3 shows SVC models for the MOD1 filtering of the initial training dataset. Depending on the chosen parameters of SVC, decision boundaries (black solid lines on FIG. 3) may be different. The decision boundaries are used to predict tillage types of "unknown" fields (FIG. 4). It is important to note that some fields (e.g., 2884844 and 2810902) are consistently located on one side of decision boundaries (nonCT side). They are fields with very clear tillage signals and can be updated directly to the training dataset. On the other hand, some fields (e.g., 2469716 and 2751126) are not consistently on one side of decision boundaries. Those fields needed to be validated using additional information. Over the 40 testing fields, 13 fields do not have consistent predicted tillage types. Among those 13 fields, 2 fields are edge of irrigation pivots, thus are not in our interest (ignore). At this moment, we do not have opportunities to truly validate those 13 fields. Therefore, those field will not be updated to the training dataset.

We inspected some fields in the tabled results shown in FIG. 7 to see if we can explain their predictions. The table in FIG. 7 lists the results for 13 fields noted above in which tillage is predicted from different decision boundaries corresponding to 15 different SVC models. 0 and 1 represent nonCT and CT, respectively. In the table, the tabulated Score represents the sum of all binary predictions and indicates if the field is closer to CT (15) or nonCT (0). For easier interpretation, Score can be translated into probability that a field is CT by diving Score to total number of SVC models (e.g. 15 in this instance). Field 2469716 was reported as MT. However, images on Planet Explorer indicated multiple soil disturbances on that field. It could be a reason why F2469716 has very high score (14 out of 15).

Figure 5:
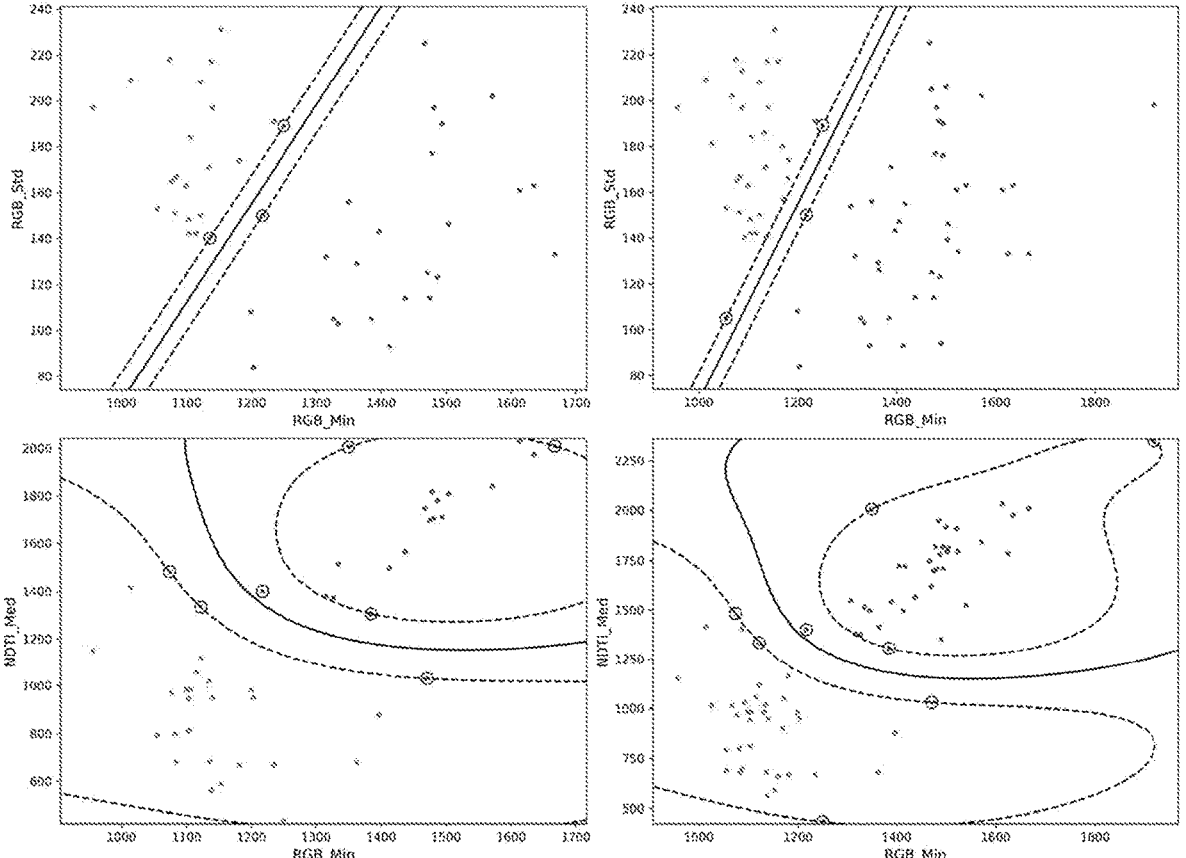
FIG. 5 illustrates the 'initial' training dataset (left panel) versus the updated training dataset (right panel) which demonstrates only minimal changes of decision boundaries because the new points are mostly not close to grey zone (between dashed lines) so they do not contribute much to creation of those decision boundaries.
Figure 6:
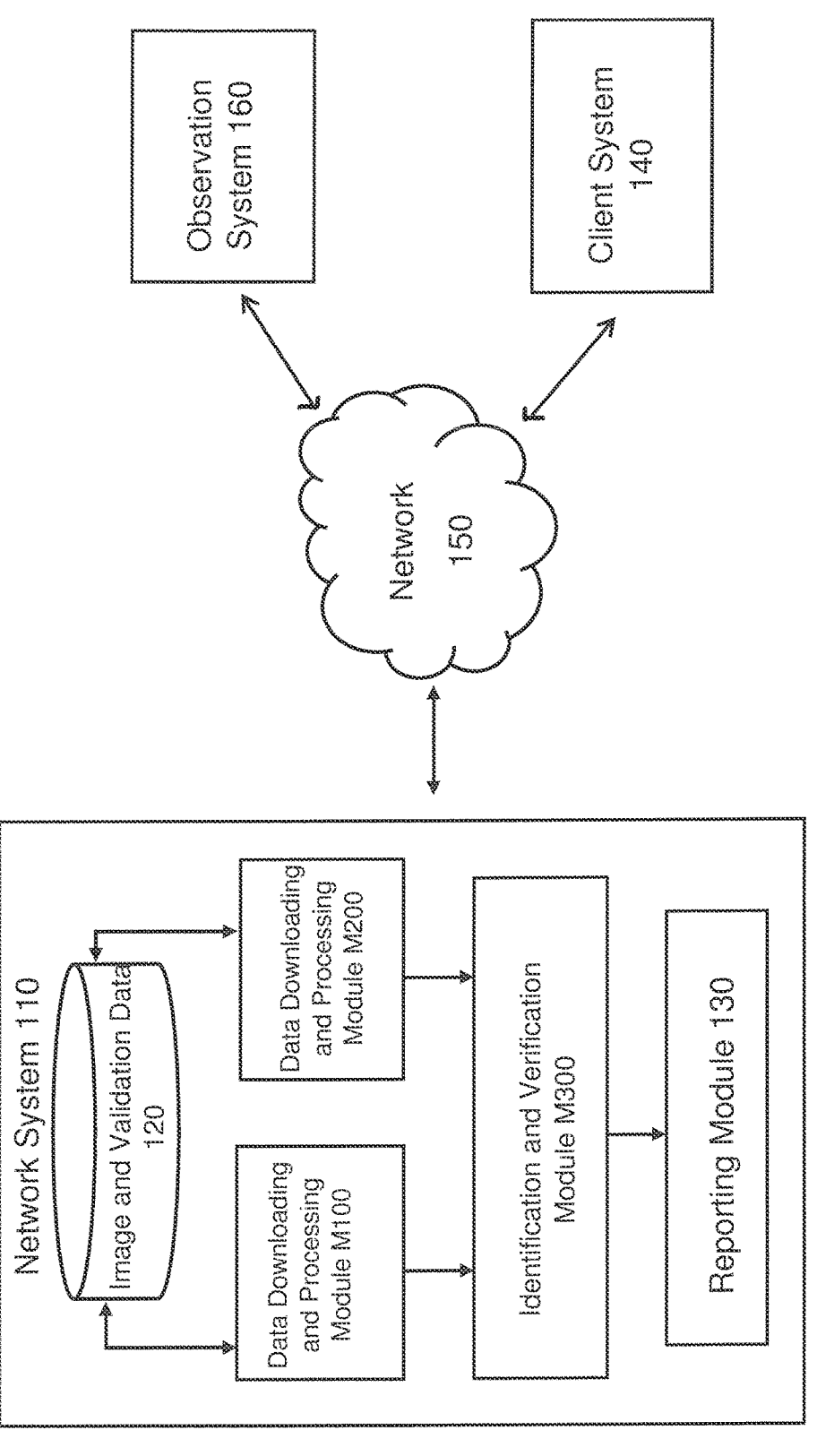
FIG. 6 is a schematic representation of the components of the tillage state verification system according to the present invention.

FIG. 5 compared the training datasets (initial vs. updated) and decision boundaries built from those fields. The updated boundaries will be used to make tillage prediction for another set of new fields.

Discussion

TIVT is a simple tool that can be used to identify tillage type of unknown fields or verify reported tillage type. There are multiple ways that we can improve TIVT:

(i) Try to have bigger training dataset. At that point, human-learning models are turned into a single machine-learning (or deep-learning) model→TIVT can exploit more input variable (derived from satellite data) more effectively. A separate fall model can be built if the training dataset has more fields with fall tillage. A bigger training dataset can also help us to fine tune the filtering process.

(ii) Radar backscatter (for example: Sentinel-1) can be used with optical data to offer "ability to see through cloud" where cloud/haze is a big issue.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A method of verifying a tillage state of an agricultural field, the method comprising:
    obtaining one or more remotely sensed images of the agricultural field;
    providing a plurality of tillage prediction models, each tillage prediction model establishing a direct relationship between image statistics derived from a plurality of time series remotely sensed images of a plurality of training fields and the known tillage states of the plurality of training fields respectively and each tillage prediction model comprising a two dimensional plot of the image statistics derived from the training fields including decision boundaries using support vector classifiers in which the decision boundaries distinguish between two different tillage states;
    calculating image statistics for the one or more remotely sensed images of the agricultural field; and
    applying the image statistics to each tillage prediction model to determine a predicted tillage state of the agricultural field by plotting the calculated image statistics for the one or more remotely sensed images of the agricultural field relative to the decision boundaries;
    wherein some of the tillage prediction models are distinguished from one another by a width between the decision boundaries by applying different parameters when plotting the decision boundaries.

2. The method according to claim 1 further comprising training the tillage prediction models by obtaining the plurality of time series remotely sensed images of the plurality of training fields, deriving the images statistics from the plurality of time series remotely sensed images of the plurality of training fields, validating said known tillage states independently of the time series remotely sensed image, and establishing said direct relationship of the tillage prediction models using the images statistics of the time series remotely sensed images of the training fields and the validated known tillage states.

3. The method according to claim 1 further comprising assigning the tillage states of the plurality of training fields as either (i) a conventional tillage state representative of conventional tillage, or (ii) a nonconventional tillage state representative of zero tillage, minimum tillage, or reduced tillage.

4. The method according to claim 1 further comprising:
    for each tillage prediction model, determining a tillage state prediction expressed in binary form distinguishing between a conventional tillage state and a nonconventional tillage state; and
    calculating the predicted tillage state for the agricultural field as a probability derived from the binary tillage state predictions from the plurality of tillage prediction models.

5. The method according to claim 4 further comprising:
    for predicted tillage states above an upper probability threshold, (i) validating the predicted tillage state as a known tillage state, and (ii) applying the remotely sensed images of the agricultural field and the known tillage state of the agricultural field to the tillage prediction models to further establish said direct relationship between the image statistics and the known tillage states of the models.

6. The method according to claim 4 further comprising:
    for predicted tillage states below a lower probability threshold, (i) validating the predicted tillage state as a known tillage state, and (ii) applying the remotely sensed images of the agricultural field and the known tillage state of the agricultural field to the tillage prediction models to further establish said direct relationship between the image statistics and the known tillage states of the models.

7. The method according to claim 1 wherein the remotely sensed images of the agricultural field include Landsat or Sentinel satellite images and at least one of the tillage prediction models is derived from Landsat or Sentinel satellite images of the training fields.

8. The method according to claim 1 further comprising:

assessing the remotely sensed images of the agricultural field to determine low quality pixels resulting from clouds; and removing remotely sensed images having a number of low quality pixels above a threshold amount from the one or more remotely sensed images that are applied to the tillage prediction models to determine the predicted tillage state of the agricultural field.

9. The method according to claim 1 further comprising:

assessing observational conditions for the remotely sensed images of the agricultural field; and applying only the remotely sensed images having optimal observational conditions to the tillage prediction models to determine the predicted tillage state of the agricultural field.

10. The method according to claim 1 further comprising:

assessing NDVI for the remotely sensed images; and removing remotely sensed images dated a prescribed number of days before NDVI first exceeds a threshold amount from the one or more remotely sensed images that are applied to the tillage prediction models to determine the predicted tillage state of the agricultural field.

11. A method of verifying tillage states of a plurality of agricultural fields, the method comprising:

for each agricultural field, obtaining one or more remotely sensed images of the agricultural fields;

providing at least one tillage prediction model establishing a direct relationship between image statistics derived from a plurality of time series remotely sensed images of a plurality of training fields and the known tillage states of the plurality of training fields respectively;

for each agricultural field, calculating image statistics for the one or more remotely sensed images of the agricultural field;

for each agricultural field applying the image statistics to the at least one tillage prediction model to determine a predicted tillage state of the agricultural field; and for predicted tillage states between a lower probability threshold and an upper probability threshold, (i) validating a tillage state of the agricultural field independently of the remotely sensed images of the agricultural field, and (ii) applying the remotely sensed images of the agricultural field and the independently validated tillage state of the agricultural field to the at least one tillage prediction model to further establish said direct relationship between the image statistics and the known tillage states of the model.

12. A method of verifying a tillage state of an agricultural field, the method comprising:

obtaining one or more remotely sensed images of the agricultural field;

providing a plurality of tillage prediction models, each tillage prediction model establishing a direct relationship between image statistics derived from a plurality of time series remotely sensed images of a plurality of training fields and the known tillage states of the plurality of training fields respectively;

calculating image statistics for the one or more remotely sensed images of the agricultural field; and applying the image statistics to the plurality of tillage prediction models to determine a predicted tillage state of the agricultural field;

wherein the remotely sensed images of the agricultural field include Landsat or Sentinel satellite images and at least one of the tillage prediction models is derived from Landsat or Sentinel satellite images of the training fields; and wherein the image statistics for said at least one of the tillage prediction models comprise spectral indexes of the Landsat or Sentinel satellite images, in which the method comprises using the spectral indexes in support vector classifiers to determine decision boundaries distinguishing between two different tillage states.

13. The method according to claim 12 wherein the spectral indexes used by the support vector classifiers to determine the decision boundaries include RGB Standard and RGB Minimum.

14. The method according to claim 12 wherein the spectral indexes used by the support vector classifiers to determine the decision boundaries include NDTI Median and RGB Minimum.

15. A method of verifying a tillage state of an agricultural field, the method comprising:

obtaining one or more remotely sensed images of the agricultural field;

providing a plurality of tillage prediction models, each tillage prediction model establishing a direct relationship between image statistics derived from a plurality of time series remotely sensed images of a plurality of training fields and the known tillage states of the plurality of training fields respectively;

calculating image statistics for the one or more remotely sensed images of the agricultural field; and applying the image statistics to the plurality of tillage prediction models to determine a predicted tillage state of the agricultural field;

wherein the remotely sensed images of the agricultural field include PlanetScope satellite images and at least one of the plurality of tillage prediction models is derived from PlanetScope satellite images of the training fields.

16. The method according to claim 15 wherein the image statistics for said at least one of the plurality of tillage prediction models comprise Red-Green-Blue reflectance of the PlanetScope satellite images, and wherein the method comprises using the Red-Green-Blue reflectance in support vector classifiers to determine decision boundaries distinguishing between two different tillage states.

17. A system for verifying a tillage state of an agricultural field, the system comprising:

a memory storing programming instructions thereon;

at least one processor operably coupled to the memory so as to execute the programming instructions whereby said at least one processor is configured to:

(i) obtain one or more remotely sensed images of the agricultural field;

(ii) calculate image statistics for the one or more remotely sensed images of the agricultural field; and (iii) determine a predicted tillage state of the agricultural field by: (a) applying the image statistics to a plurality of tillage prediction models stored on the memory, in which each tillage prediction model establishes a direct relationship between image statistics derived from a plurality of time series remotely sensed images of a plurality of training fields and the known tillage states of the plurality of training fields respectively and in which each tillage prediction model determines the tillage state prediction in binary form distinguishing between a conventional tillage state and a nonconventional tillage state; and (b) calculating the predicted tillage state for the agricultural field as a probability derived from the binary tillage state predictions from the plurality of tillage prediction models.

18. The system according to claim 17 wherein the processor is further configured to train the tillage prediction models by (i) deriving the images statistics from the plurality of time series remotely sensed images of the plurality of training fields, and (ii) establishing said direct relationship of the tillage prediction models using the images statistics of the time series remotely sensed images of the training fields and known tillage states which are validated independently of the time series remotely sensed images of the training fields.

* * * * *